Patented May 25, 1937

2,081,771

UNITED STATES PATENT OFFICE 2,081,771

METHOD OF PRODUCING DRY-RECTIFIERS AND BLOCKING LAYER-PHOTOCELL PLATES

Emil Rupp, Reihen, Germany, assignor to Allgemeine Elektricitatz Gesellschaft, Berlin, Germany, a corporation of Germany No Drawing. Application January 24, 1936, Serial No. 60,637. In Germany February 5, 1935

2 Claims. (Cl. 136—89)

In the manufacture of plates for dry rectifiers especially selenium rectifiers, the semi-conducting layer formed of selenium for instance, is ordinarily applied to the carrier plate forming at the same time the electrode, this application taking place for instance by way of melting the layer material whereafter forming is carried out in that the plates are subjected for a certain length of time to a definite pressure and temperature treatment. This forming method requires great care as regards retaining accurately the working conditions and demands considerable length of time.

The subject matter of the invention is a forming method which as compared with the pressure-temperature treatment is distinguished by its simplicity, inexpensiveness and large saving of time. In the first place this method furnishes layers of excellent rectifying action and great uniformity. The method according to the invention resides in that a mercury compound amounting to less than 3 percent by weight is added to the molten semi-conductor such as selenium for instance. The optimum for the added substance lies approximately between 1 to 2%. The use of mercury bromide or mercury chloride was found to be especially suited. The molten mixture is applied to the carrier plate. The forming consists in simply heating without pressure and in the case of selenium for instance, the heating temperature is about 180 to 200° C. which is the same forming temperature as hitherto used but without pressure. The time of forming is a fraction of the time hitherto required and is to be ascertained by way of testing and in accordance with the thickness of the layer. The further treatment of the plate in particular the provision of the counter electrode is the same as hitherto carried out.

Since blocking layer photo-cells are based upon exactly the same physical principle as dry rectifiers, the aforementioned is to be correspondingly applied to blocking layer photocells.

I claim:
1. A method of making dry rectifier plates, light-sensitive cell plates and the like in particular plates wherein the semi-conducting material comprises a substance such as selenium characterized in that to the molten semi-conducting material there is added one of the mercury compounds from the group which includes mercury bromide and mercury chloride amounting to between one to three percent by weight, applying the resulting mixture to a carrier plate and heating the plate after the mixture is applied thereto to a temperature between 180° and 200° C. under normal atmospheric conditions.

2. A plate for use in making dry rectifiers, light-sensitive elements and the like, said plate having formed on at least one face thereof a layer of selenium to which has been added from one to three percent by weight of one of the mercury compounds from the group which includes mercury bromide and mercury chloride.

EMIL RUPP.